UNITED STATES PATENT OFFICE.

RAYMOND C. BENNER AND HARRY F. FRENCH, OF FREMONT, OHIO, ASSIGNORS TO NATIONAL CARBON COMPANY, A CORPORATION OF NEW JERSEY.

ELECTRIC BATTERY.

1,255,283.      Specification of Letters Patent.      Patented Feb. 5, 1918.

No Drawing.      Application filed July 13, 1916. Serial No. 109,049.

*To all whom it may concern:*

Be it known that we, RAYMOND C. BENNER and HARRY F. FRENCH, citizens of the United States, residing at Fremont, in the county of Sandusky and State of Ohio, have invented a certain new and useful Improvement in Electric Batteries, of which the following is a full, clear, and exact description.

This invention relates to electric batteries, and while the invention is not necessarily limited thereto, we find it of especial value in connection with copper oxid cells having an alkali electrolyte. In this type of battery the positive electrode usually consists of zinc and the negative electrode of powdered copper oxid inclosed in a perforated container. In some cases the negative electrode consists of a block of molded copper oxid, but the electro-chemical action is, however, the same. The complete battery consists of a jar having an alkaline electrolyte, such as sodium hydroxid, with an appropriate cover from which the two electrodes are suspended. It has been found that sulfur has a remarkable property of materially increasing the voltage of the copper oxid cell, and in addition, causing an increase in service life. A patent application covering this discovery was filed November 30, 1915, by R. W. Erwin, Serial No. 64,342.

We have discovered that the beneficial results of sulfur in the cell may be obtained by dissolving it in an oil and soaking the copper oxid element therein. The oil with the copper oxid forms a sluggish mass and will not sift out during shipment. When the element is placed in the cell a considerable part of the oil rises to the surface and acts as the oil seal usually employed in such batteries. It is therefore unnecessary to add any oil when assembling the battery, as this is taken care of automatically. Either a part of the sulfur containing oil or of the sulfur remains in the copper oxid mass so that a quantity of sulfur is retained in position to act with the copper oxid in producing the high voltage.

Various mineral oils may be used, but we have found that red oil is satisfactory for the purpose. In such oil we dissolve all, or only part of the sulfur that it will take in solution. A convenient way to saturate the oil with sulfur is to heat an excess of sulfur in oil and permit the excess to crystallize out. The supernatant oil saturated with sulfur may then be used in the way described above. We have also added the hot saturated oil to the copper oxid element and permitted the excess sulfur to crystallize out in the depolarizing mass. However, it is not necessary to saturate the oil with sulfur, as any amount of sulfur less than this may be used if desired.

In case of the invention being used in cells having a solid block of copper oxid, oil and sulfur could be incorporated therein by soaking the oxid block in oil containing sulfur, as described in connection with the powdered oxid.

Instead of using oil in which sulfur has been artificially dissolved, we may employ natural oils containing sulfur, that is, oils which have not been freed of their sulfur content. These oils may contain the sulfur as a compound instead of elemental sulfur and the claims are intended to cover such variations, as we have found that many sulfur compounds also raise the voltage and give an increase of service life.

Having described our invention, what we claim is:—

1. In electric batteries, a negative element consisting of copper oxid and an oil containing sulfur in solution.

2. In electric batteries, an alkaline electrolyte, a positive electrode and a negative element of copper oxid soaked in oil containing sulfur in solution.

3. In electric batteries, an alkaline electrolyte, a positive electrode, a negative element of copper oxid containing an oil holding sulfur in solution, and a perforated container around said negative element.

4. The process of incorporating sulfur in a battery depolarizing mass, which consists in dissolving the sulfur in oil and soaking said depolarizing mass therein.

5. The process of incorporating sulfur in a battery depolarizing mass, which consists in dissolving sulfur in a hot oil and soaking the depolarizing mass in the oil when cool.

6. The process of incorporating sulfur in a depolarizing mass, which consists in dissolving it in hot oil until it is substantially saturated, and soaking said depolarizing mass in a hot oil whereby sulfur crystallizes out on cooling.

In testimony whereof, we hereunto affix our signatures.

RAYMOND C. BENNER.
HARRY F. FRENCH.